H. F. & C. A. DEPUE.
MOTOR VEHICLE.
APPLICATION FILED JUNE 12, 1916.

1,225,938.

Patented May 15, 1917.
2 SHEETS—SHEET 1.

INVENTORS.
H. F. DEPUE
C. A. DEPUE
BY Milton S. Crandall,
ATTORNEY.

H. F. & C. A. DEPUE.
MOTOR VEHICLE.
APPLICATION FILED JUNE 12, 1916.

1,225,938.

Patented May 15, 1917.
2 SHEETS—SHEET 2.

INVENTORS
H. F. DEPUE
C. A. DEPUE
BY Milton S. Crandall
ATTORNEY

UNITED STATES PATENT OFFICE.

HERBERT F. DEPUE AND CLARK A. DEPUE, OF MOVILLE, IOWA.

MOTOR-VEHICLE.

1,225,938.

Specification of Letters Patent. Patented May 15, 1917.

Application filed June 12, 1916. Serial No. 103,300.

*To all whom it may concern:*

Be it known that we, HERBERT F. DEPUE and CLARK A. DEPUE, citizens of the United States, and residents of Moville, in the county of Woodbury and State of Iowa, have invented certain new and useful Improvements in Motor-Vehicles, of which the following is a specification.

The present invention relates to motor-vehicles, and more particularly to the driving and steering mechanism thereof.

The invention has for its primary object the provision in a motor-vehicle of improved means for driving both axles of the vehicle to increase its tractive power.

Another object of the invention is the production in a motor-vehicle of an improved construction wherein both axles are driven and also adapted to turn laterally to guide the vehicle.

A further object of the invention is the production of an improved driving and steering mechanism, designed for use with the usual type of differential gearing and particularly adapted for driving and steering both axles of motor-trucks.

With these and other objects in view, the invention, consisting in the construction, combination and novel arrangement of parts, will be fully understood from the following description, reference being had to the accompanying drawings, which form a part of this application, and in which like characters of reference indicate corresponding parts throughout the several views, of which,—

Figure 1:
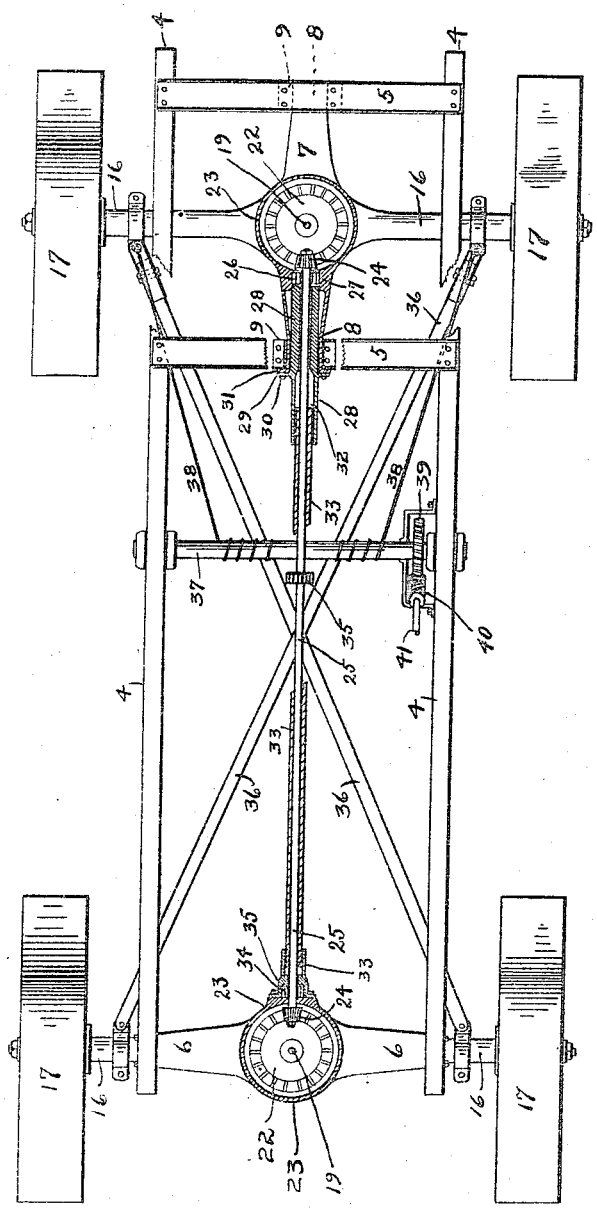
Figure 2:
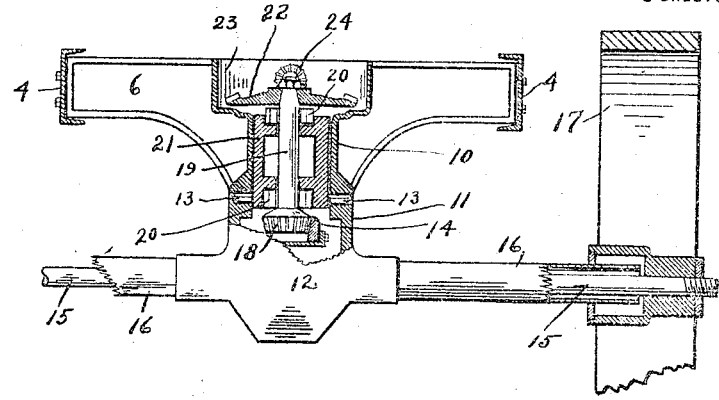
Figure 3:
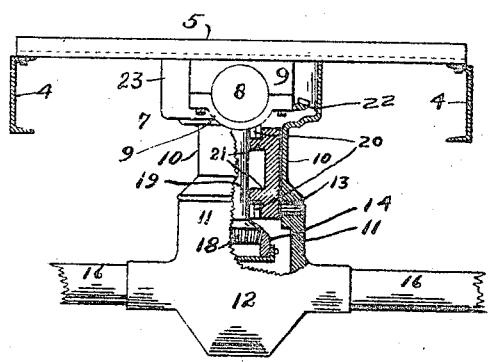

Figure 1 is a plan of a tractor chassis constructed and equipped in accordance with the invention, the drive shaft being cut away and the drive-gear housings shown in horizontal section on a plane coincident with the axis of the drive-shaft; Fig. 2 is a fragmentary rear elevation of the rear truck; and Fig. 3 is a fragmentary front elevation of the front truck of the vehicle.

Referring, now, to the illustrations, the main frame of the vehicle comprises side members, 4, the front portions of which are interconnected by cross members, 5.

The rear ends of the side members are interconnected and supported by a transversely disposed bolster, 6; and the front of the main frame is supported on a bolster, 7, disposed longitudinally of the frame, and having its ends formed with journals, 8, free to oscillate in bearings, 9, mounted under the cross members of the frame.

The center of each bolster is formed with a cylindrical upright housing, 10, supported by and alined coaxially with a cylinder, 11, formed on a differential gear case, 12, and free to turn on roller bearings, 13, interposed between the two cylinders.

The gear case, 12, incloses the usual differential gear, including a bevel drive ring, 14, and adapted to drive the axle shafts, 15, rotating within the axle housings, 16, and having secured thereto the traction wheels, 17.

The bevel drive rings, 14, are intermeshed with bevel pinions, 18, carried by short drive shafts, 19, inclosed coaxially by the housings, 10, and 11, and journaled in roller-bearings, 20, retained by suitable bearing-cones, 21, inclosed by the housings, 10, and entering the housings, 11.

The upper ends of the shafts, 19, carry bevel-gears, 22, inclosed by enlarged portions, 23, of the bolster housings, and driven by bevel-pinions, 24, mounted on the ends of the main drive-shaft, 25.

The rear journal of the front bolster is hollow, and incloses, coaxially, the adjacent end portion of the main drive shaft, journaled in roller bearings, 26, retained by a cone, 27, formed in the bolster adjacent the housing, 10.

Rearward displacement of the roller-bearings, 26, is prevented by a sleeve, 28, encircling the drive-shaft and inclosed by the journal of the bolster. The sleeve is provided with an annular flange, 29, which embraces and is secured by screws, 30 or otherwise, to a similar flange, 31, on the journal of the bolster, which engages the rear side of the adjacent bearing 9. The said sleeve is provided with a counter-bore, 32, to freely inclose the end of the torsion-tube, 33.

The rear end of the drive-shaft, 25, is journaled in roller bearings, 34, retained by a flanged bearing cone, 35, bolted or otherwise secured to the rear housing, 23, and freely inclosing the rear end of the torsion tube.

The main-drive shaft is represented as being continuous, and provided with a drive pinion, 35ª.

The ends of each axle are pivotally connected by links, 36, with the opposite ends of the other axle, whereby the axles turn laterally in unison.

37 represents the steering-gear shaft which is disposed transversely of the main-frame and has wound in opposite directions thereon flexible links, 38, secured respectively to the ends of the front axle.

The steering-gear shaft is controlled by a gearing including a worm-wheel, 39, mounted on the shaft, 37, and intermeshed with a worm, 40, on the steering-post, 41.

The front bolster being disposed longitudinally of and pivoted to the frame, permits relative vertical oscillation between the frame and front axle.

Having thus described our invention, what we claim as new and desire to secure by Letters Patent, is,—

1. In a motor vehicle, a main frame, a drive axle including an axle housing, a differential gear and its housing, a bolster disposed longitudinally of the main frame and supported by the differential housing, the bolster being provided with journals at its ends, bearings on the main frame inclosing the journals, a drive shaft extending through one of the journals, and a driving connection between the shaft and said gearing.

2. In a motor-vehicle, a main frame, front and rear axles, each including an axle-shaft and its housing, a differential-gear housing, and a differential-gear inclosed thereby and having a bevel drive-ring, front and rear bolsters supporting the main-frame and having intermediate parts supported by the differential-gear housings, upright shafts rotatably inclosed by said parts, and upon which the latter housings are pivoted, bevel pinions on the lower ends of said shafts and engaged with the drive rings, bevel-gears on the upper ends of said shafts, the front bolster being disposed longitudinally of the main-frame and provided at its ends with journals pivoted on the main-frame, the rear one of said journals being provided with an axial bore communicating with said part, a main-drive shaft disposed longitudinally of the main-frame, and having its front end portion inclosed by said bore, and bevel-pinions on the main drive-shaft engaged with said latter gears.

3. In a motor vehicle, a main frame, front and rear axles, each including an axle-shaft and its housing, a differential-gear housing, and a differential-gear inclosed thereby and having intermediate parts supported by the differential-gear housings, upright shafts rotatably inclosed by said parts, and upon which the latter housings are pivoted, bevel pinions on the lower ends of said shafts and engaged with the drive rings, bevel-gears on the upper ends of said shafts, the front bolster being disposed longitudinally of the main-frame and provided at its ends with journals pivoted on the main frame, the rear one of said journals being provided with an axial bore communicating with said part, a main-drive shaft disposed longitudinally of the main-frame, and having its front end portion inclosed by said bore, bevel-pinions on the main drive shaft engaged with said latter gears, links connecting the ends of each axle with the opposite ends of the other axle, a steering-gear shaft, flexible links wound in opposite directions thereon, and connected with the respective ends of one of said axles, and means for controlling said latter shaft, including a worm-wheel on the latter shaft and a steering-post having a worm engaged with the worm-wheel.

4. In a motor-vehicle, a main-frame, front and rear axles, front and rear bolsters supporting the main-frame and supported by the axles, one of said bolsters being disposed longitudinally of the main-frame and provided with journals at its ends, bearings on the main-frame inclosing the journals, a drive-shaft disposed longitudinally of the main-frame and rotatable coaxially within one of said journals and vehicle-propelling mechanism within the bolsters actuated by said shaft.

In testimony whereof we have hereunto set our hands.

HERBERT F. DEPUE.
CLARK A. DEPUE.